(12) United States Patent
Kunz et al.

(10) Patent No.: US 8,116,311 B1
(45) Date of Patent: Feb. 14, 2012

(54) METHOD AND SYSTEM FOR TAG ARBITRATION IN SWITCHES

(75) Inventors: James A. Kunz, Plymouth, MN (US); Mark A. Owen, Apple Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 361 days.

(21) Appl. No.: 12/615,152

(22) Filed: Nov. 9, 2009

Related U.S. Application Data (60) Provisional application No. 61/114,352, filed on Nov. 13, 2008.

(51) Int. Cl.
*H04L 12/28* (2006.01)

(52) U.S. Cl. ........................................ 370/389

(58) Field of Classification Search .................. 370/389, 370/392, 411, 412, 414, 416, 420, 422, 423, 370/426, 470–472; 709/240–242; 398/56
See application file for complete search history.

(56) References Cited

U.S. PATENT DOCUMENTS

| | | | |
|---|---|---|---|
| 6,956,818 B1* | 10/2005 | Thodiyil | 370/230 |
| 2009/0168790 A1* | 7/2009 | Lee | 370/412 |

* cited by examiner

*Primary Examiner* — Kwang B Yao
*Assistant Examiner* — Tung Q Tran
(74) *Attorney, Agent, or Firm* — Klein, O'Neill & Singh, LLP (57) ABSTRACT

Method and system for a switch element is provided. The method includes (a) receiving a portion of a packet at a port of the switch element; (b) generating a tag based on an estimated packet size obtained from the portion of the packet; (c) sending the tag with the estimated packet size to a transmit segment of the port; (d) selecting a request from among a plurality of pending requests for processing the packet associated with the tag; (e) receiving an actual packet size for the packet in step (a); (f) determining if the actual packet size is different from the estimated packet size; and (g) adjusting an arbitration weight used for selecting the request in step (d), if the actual packet size is different from the estimated packet size.

20 Claims, 7 Drawing Sheets

| Receive Port -ID | Output VL Identifier | Packet Block Count | Pointer to Packet Location in RBUF |
|---|---|---|---|
| 230 | 232 | 234 | 236 |

# METHOD AND SYSTEM FOR TAG ARBITRATION IN SWITCHES

CROSS REFERENCE TO RELATED APPLICATIONS

This application claims the benefit and priority of U.S. provisional application Ser. No. 61/114,352, entitled "METHOD AND SYSTEM FOR TAG ARBITRATION IN NETWORK SWITCHES", filed Nov. 13, 2008, which is incorporated herein by reference in its entirety for all purposes.

BACKGROUND

1. Technical Field

The present invention relates to networks.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including switches.

A switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets.

A switch may use a tag to describe a packet that is received at a port. Typically, a tag is generated for each packet that is received at the port. When multiple tags are waiting to be processed, an arbitration scheme is used to select a tag from among the multiple tags that may be waiting at any given time for processing. Efficient processing of tags is desirable for efficient network communication.

SUMMARY

In one embodiment, a method for a switch element is provided. The method comprises: (a) receiving a portion of a packet at a port of the switch element; (b) generating a tag based on an estimated packet size obtained from the portion of the packet; (c) sending the tag with the estimated packet size to a transmit segment of the port; (d) selecting a request from among a plurality of pending requests for processing the packet associated with the tag; (e) receiving an actual packet size for the packet in step (a); (f) determining if the actual packet size is different from the estimated packet size; and (g) adjusting an arbitration weight used for selecting the request in step (d), if the actual packet size is different from the estimated packet size.

In another embodiment, a switch element is provided. The switch element comprises: (a) a receive segment at a port for receiving a portion of a packet, generating a tag based on an estimated packet size obtained from the portion of the packet; and sending the tag with the estimated packet size to a transmit segment of the port; (b) an arbitration module for selecting a request from among a plurality of pending requests for processing the packet associated with the tag; and (c) logic for determining if an actual packet size is different from the estimated packet size; and generating a control signal for adjusting an arbitration weight used for selecting the request, if the actual packet size is different from the estimated packet size.

In yet another embodiment, a method for a switch element is provided. The method comprises: (a) receiving a portion of a packet at a receive segment of a port of the switch element; (b) generating a tag based on an estimated packet size obtained from the portion of the packet; wherein the receive segment generates the tag; (c) sending the tag with the estimated packet size to a transmit segment of the port; wherein the receive segment sends the tag to the transmit segment; (d) selecting a request from among a plurality of pending requests for processing the packet associated with the tag; wherein an arbitration module selects the tag from among the plurality of pending requests; (e) receiving an actual packet size for the packet in step (a); (f) determining if the actual packet size is different from the estimated packet size; and (g) adjusting an arbitration weight used for selecting the request in step (d), if the actual packet size is different from the estimated packet size.

This brief summary has been provided so that the nature of the disclosure may be understood quickly. A more complete understanding of the disclosure can be obtained by reference to the following detailed description concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Definitions

The following definitions are provided for convenience as they are typically (but not exclusively) used in a networking and computing environment, implementing the various adaptive embodiments described herein.

"Packet": A group of one or more network data word(s) used for network communication. A frame may also be referred to as a packet.

"Port" is a logical and physical structure at a device that is used for sending and receiving network information. The structure and logic depends on the protocol that is used for communication. A switch typically has a plurality of ports for receiving and transmitting information.

"Switch": A device that facilities network communication.

"Virtual Lane" (VL): VL is a logical lane structure that allows one to logically divide a physical lane into a plurality of virtual lanes. The manner in which the virtual lanes/links are created and managed is often dictated by network standards and protocols. For example, in the InfiniBand (IB) standard, the term VL is defined by Section 3.5.7 of the IB Specification. The IB specification provides a mechanism for creating virtual links within a single physical link. A virtual lane represents a set of transmit and receive buffers in a port. A data VL is used to send IB packets and according to the IB Specification, configured by a subnet manager based on a Service Level field in a packet.

As a preliminary note, any of the embodiments described with reference to the figures may be implemented using software, firmware, hardware (e.g., fixed logic circuitry), manual processing, or a combination of these implementations. The term "logic" "module," "component," "system" or "functionality" as may be used herein generally represents software, firmware, hardware, or a combination of these elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over plural locations.

The terms "machine-readable media" or the like when used, refer to any kind of medium for retaining information in any form, including various kinds of storage devices (magnetic, optical, static, and the like). The term machine-readable media also encompasses transitory forms for representing information, including various hardwired and wireless links for transmitting the information from one point to another.

The embodiments disclosed herein, may be implemented as a computer process (a method), a computing system, or as an article of manufacture, such as a computer program product or computer readable media. The computer program product may be a computer storage media readable by a computer device and encoding a computer program of instructions for executing a computer process. The computer program product may also be a propagated signal on a carrier readable by a computing system and encoding a computer program of instructions for executing a computer process.

To facilitate an understanding of the various embodiments, the general architecture and operation of a network system will be described. The specific architecture and operation of the various embodiments will then be described with reference to the general architecture of the network system. It is noteworthy that the various embodiments of the present disclosure are not limited to any particular protocol or standard.

Figure 1A:
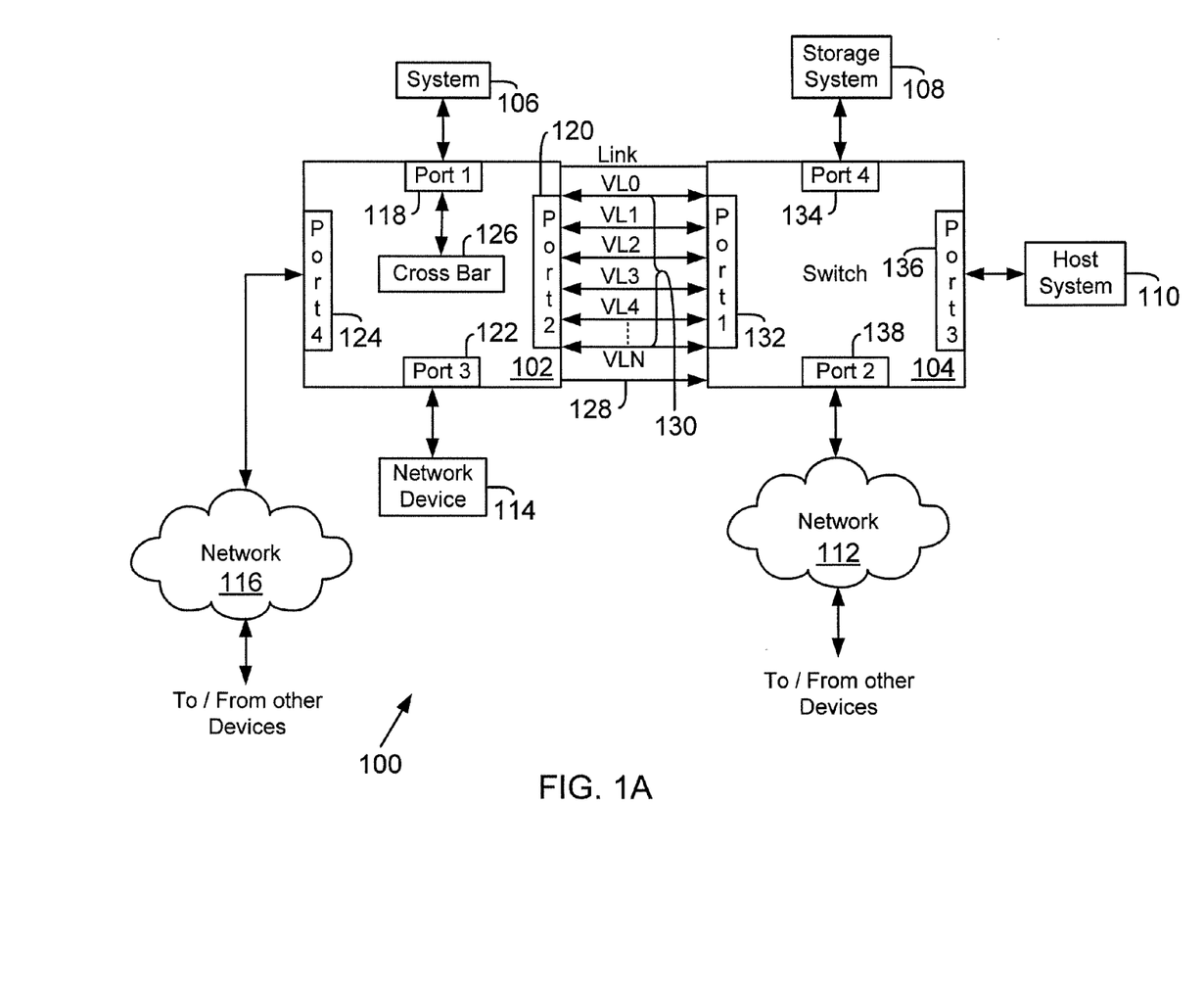
FIG. 1A shows a block diagram of a network system, according to one embodiment.

FIG. 1A shows a block diagram of a network system 100 for moving information between various ports, according to one embodiment. System 100 includes one or more switches, for example, switches 102 and 104, operationally coupled to various other elements using various ports, for example, ports 118, 120, 122 and 124 on switch 102 and ports 132, 134, 136 and 138 on switch 104. In one embodiment, switch 102 may be coupled to system 106, network device 114 and network 116, via ports 118, 122 and 124, respectively.

Switch 104 may be operationally coupled to storage system 108, network 112 and host system 110 via ports 134, 136 and 138, respectively. In one embodiment, port 120 of switch 102 may be coupled to port 132 via a network link 128. A plurality of virtual lanes 130 (shown as VL0 to VLn) may be used between ports 120 and port 132.

Systems 106, 108 and 110 typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
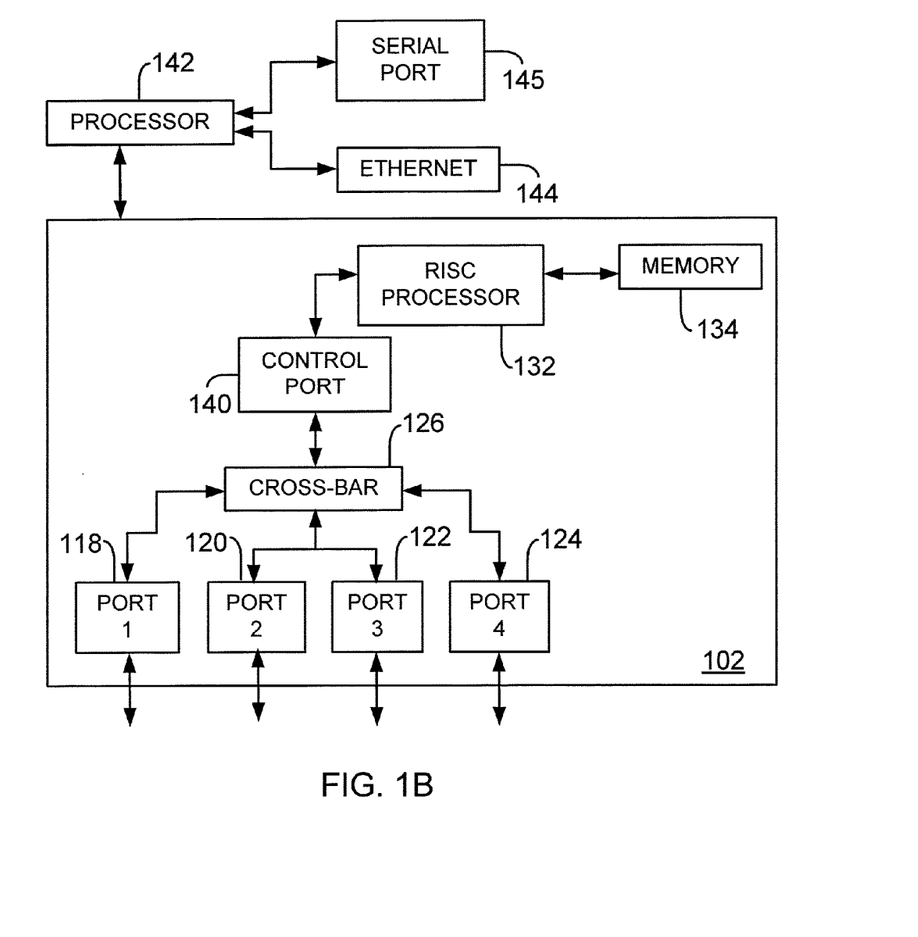
FIG. 1B shows a block diagram of a switch using the system, according to one embodiment.

FIG. 1B shows a block diagram of switch 102 that includes a processor 132, which is operationally coupled to plural ports 118, 120, 122 and 124 via a control port 140 and crossbar 126. In one embodiment, processor 132 may be a reduced instruction set computer (RISC) type microprocessor. Processor 132 executes firmware instructions out of memory 134 to control the overall operations of switch 102. Crossbar 126 is used to move information among ports 118-124. Control port 140 is used to send control information to each port.

Switch 102 may be coupled to an external processor 142 that is coupled to an Ethernet port 144 and serial port 145. In one embodiment, processor 142 may be a part of computing system 106. A network administrator may use processor 142 to configure switch 102.

Various protocols and standards may be used for network communication by switch 102. InfiniBand ("IB") is one such protocol. IB is a switched fabric interconnect standard for servers, incorporated herein by reference in its entirety. IB technology is deployed for server clusters/enterprise data centers ranging from two to thousands of nodes.

An IB switch, for example, 102, is typically a multi-port device. Physical links (optical or copper) connect each port in a switch to another IB switch or an end device (for example, Target Channel Adapter (TCA) or a Host Channel Adapter (HCA)).

Figure 1C:
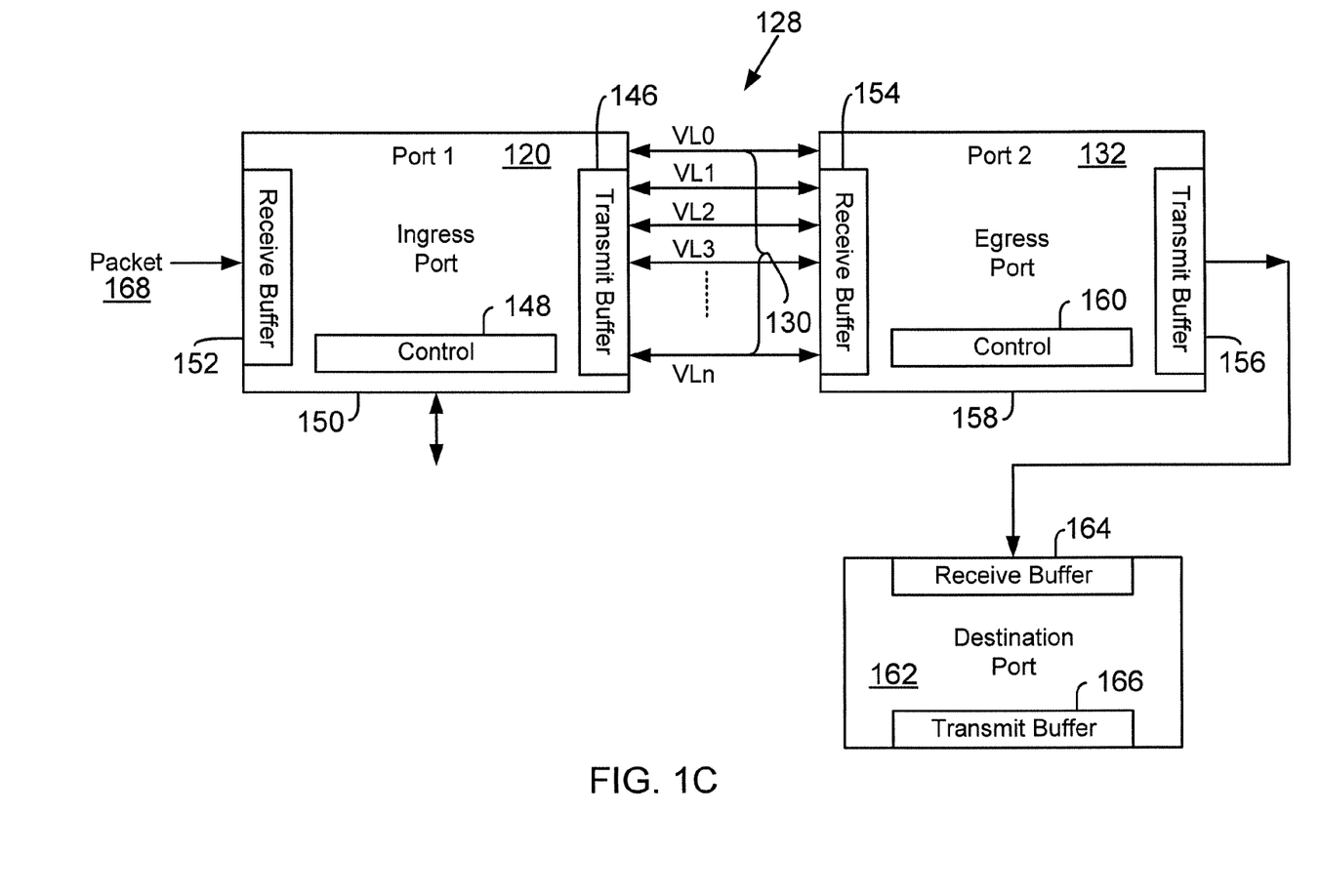
FIG. 1C shows a plurality of ports communicating with each other, according to one embodiment.

FIG. 1C shows an example of packet flow among a plurality of ports. In this example, port 120 (ingress) receives a packet 168 and sends the packet 168 to port 132 (egress), which sends the packet to a destination port, port 162. The packet may be an IB packet in an IB based network.

Each port 120, 132 and 162 may include a receive buffer 152, 154 and 164, respectively, to receive and temporarily store a packet, such as packet 168. Each port 120, 132 and 162 may also include a transmit buffer 146, 156 and 166, respectively, to temporarily store a packet before the packet is sent to its destination.

Generally, to ensure proper flow control, credit (i.e. space) should be available at a receive buffer before a packet is transmitted by a port. For example, before ingress port 120 sends packet 168 to egress port 132, space should be available at receive buffer 154 of egress port 132. Egress port 132 sends a flow control packet to ingress port 120 to synchronize available credit information between egress port 132 and ingress port 120.

Figure 2A:
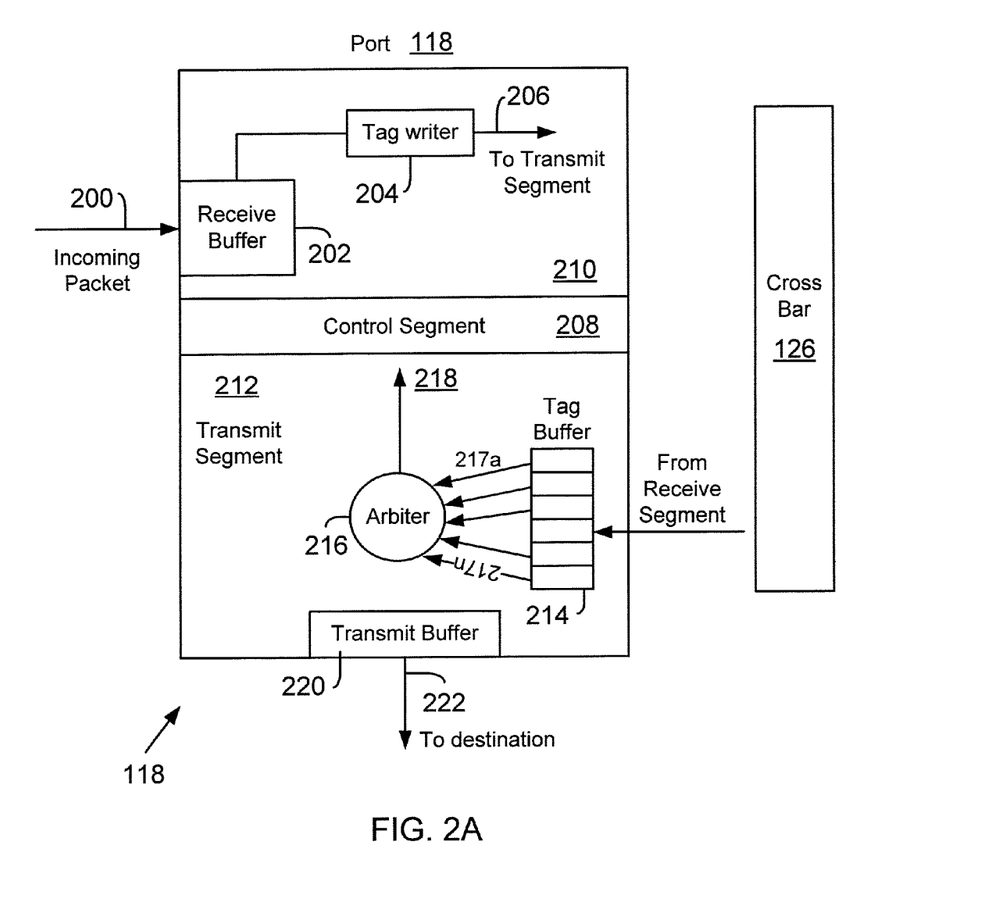
FIG. 2A shows an example a port structure, used according to one embodiment.

FIG. 2A shows an example of a port 118 (or 120) used according to one embodiment. Port 118 may include a receive segment 210 for receiving and processing received packets; a control segment 208 for storing port level control information and a transmit segment 212 that transmits packets to their destinations.

An incoming packet 200 (similar to 168, FIG. 1C) is received and stored at receive buffer 202 (similar to receive buffers 152, 154 and 164, FIG. 1C) in receive segment 210. A tag writer module 204 generates a tag 206 for the packet. The tag includes information regarding packet 200. FIG. 2C provides an example of tag 206 that includes a plurality of fields, for example, (a) a receive port identifier 230 that uniquely identifies the port that receives the packet; (b) an output virtual lane identifier 232 that identifies a virtual lane that is used for transmitting the received packet; (c) a packet block count 234 that provides an estimate of packet size; and (d) a pointer 236 that indicates where in a receive buffer the packet is being stored before the packet is transmitted by a transmit segment.

Tag writer 204 forwards tag 206 to the transmit segment 212 via crossbar 126. The transmit segment 212 includes a tag buffer 214 and arbiter 216. Tag buffer 214 is used to store a plurality of tags (for example, 206) at any given time.

Arbiter 216 receives a plurality of requests 217a to 217n. Each request is on behalf of a stored tag in tag buffer 214. Arbiter 216 arbitrates between requests 217a-217n and selects one of the plurality of tags for processing. Arbiter 216 may use any arbitration scheme for example, a round robin arbitration scheme to select a tag.

After tag 206 is selected, a request 218 to fetch packet 200 associated with tag 206 is generated and sent to the receive segment. The packet associated with tag 206 is then fetched from a receive buffer location and then transmitted to its destination 222 by transmit segment 212, via transmit buffer 220.

Figure 2B:
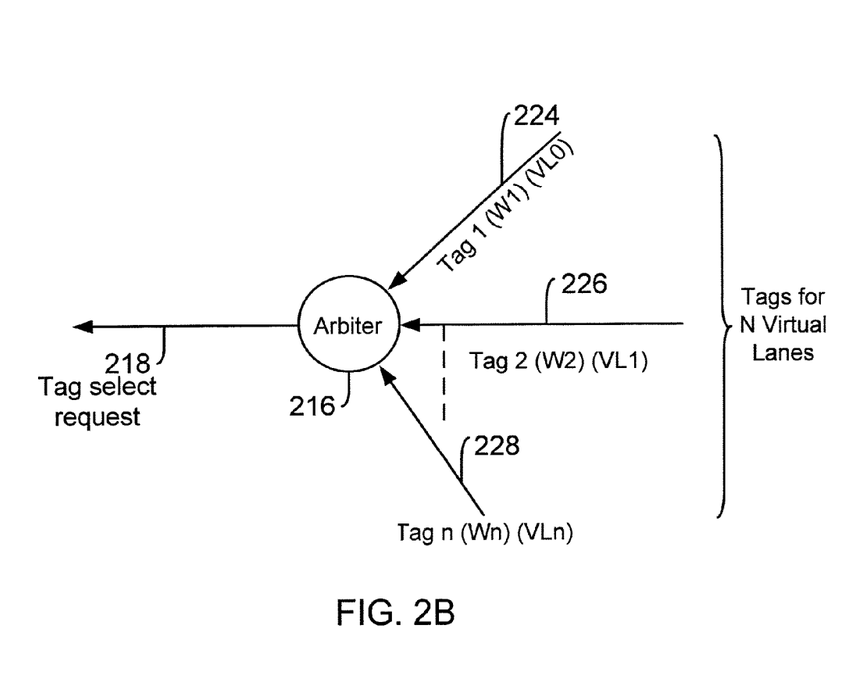
FIG. 2B shows a diagram for tag arbitration with weights for virtual lane tags, according to one embodiment.
Figure 2C:
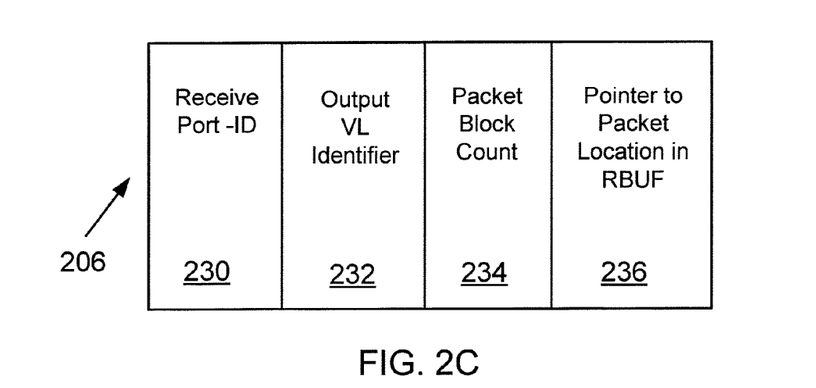
FIG. 2C shows an example of a tag, used according to one embodiment.

FIG. 2B shows an example of the overall arbitration scheme used according to one embodiment. Arbiter 216 receives a plurality of tag requests, for example, Tag1 224, Tag2 226 to Tagn 228 (similar to requests 217A-217n (FIG. 2A)). The requests are associated with a plurality of virtual lanes, VL0 to VLn (for example, 130, FIG. 1C), that are used to transmit packets to one or more destinations.

Each tag request also includes an associated weight, shown as W1, W2 to Wn. The weights indicate to arbiter 216 when a priority for a virtual lane has to change. The weights are "current" at any given time, based on available credit at a destination receive buffer.

In one embodiment, the associated weight is based on the packet size that is received at a receive buffer. In conventional switches, the switch has to wait for the entire packet to arrive before a tag is submitted to arbiter 216. One reason for waiting is often dictated by the protocol standards. For example, the IB standard requires that the "current-weight" should be accurate within 4 bytes. In order to meet the accuracy standard, conventional switches wait for the packet to arrive before submitting the tag for a packet. If the packet is large, then so is the wait time. Waiting for the entire packet to arrive and then arbitrating slows down the arbitration process and hence slows down packet transmission.

The embodiments disclosed herein provide a better solution than what is available with conventional switches. In one embodiment, a tag is generated and submitted to arbiter 216 even before the entire packet is received. An estimate of the packet size is used for arbitration purposes. The estimate is adjusted after the packet is actually received at a receive segment of a port.

Figure 3:
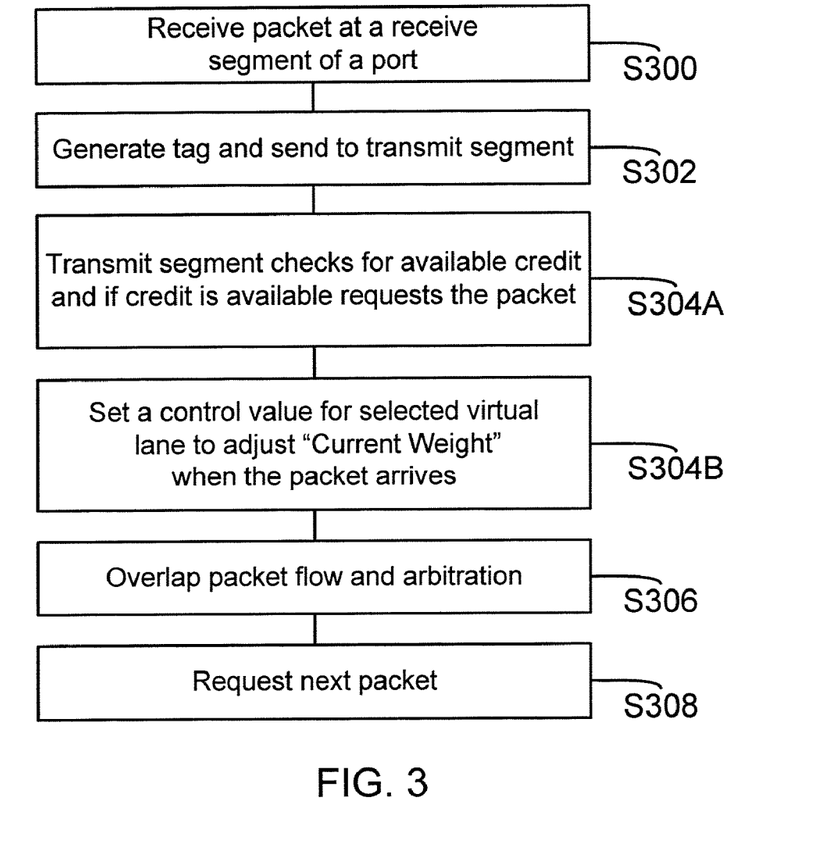
FIG. 3 shows a process flow diagram for tag arbitration, according to one embodiment.

The following description of the process flow for tag arbitration is now made with reference to FIG. 3, according to one embodiment, and with further reference to FIGS. 2A-2C. The process starts in block S300, when at least a portion of a packet is received at a receive segment of a port. For example, at least a portion of packet 200 may be received at receive buffer 202 of receive segment 210.

In block S302, a tag is generated and sent to the transmit segment for arbitration. In one embodiment, tag writer module 204 generates tag 206. Tag 206 includes an identifier 232 for an output virtual lane that is used to transmitting the packet to its destination and a field 234 indicating the estimated packet size based on the packet block count field 234 (FIG. 2C). Tag 206 is then stored in tag buffer 214 before a request is generated for arbiter 216.

In block S304A, transmit segment 212 determines if credit is available at the packet destination based on the packet block count field 234 in the tag. If credit is available, then the transmit segment sends a request to the receive segment for the packet. A "current-weight" for the output VL is adjusted by subtracting the packet count field in the tag.

Figure 5:
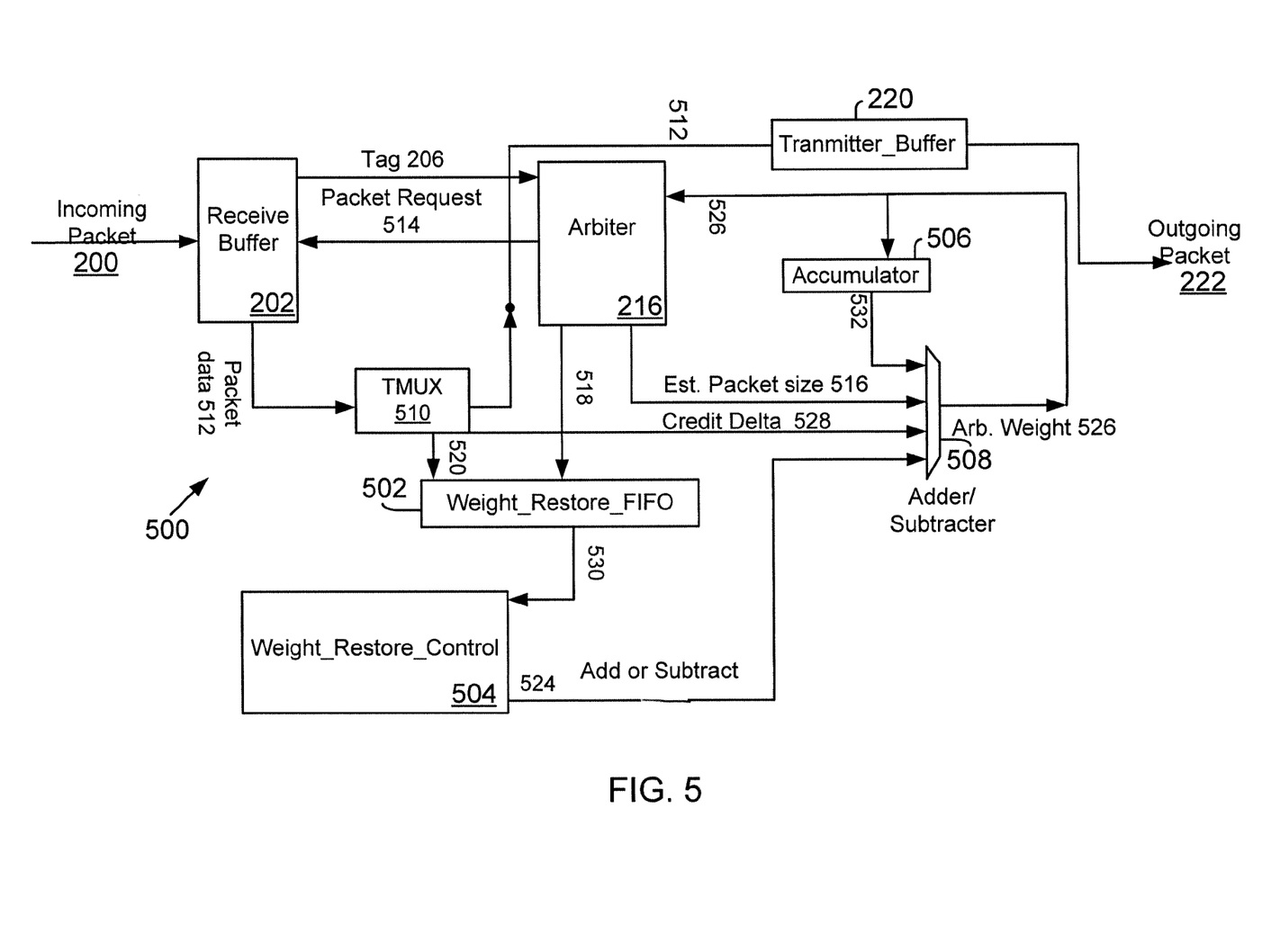
FIG. 5 shows a schematic for adjusting a "current-weight" and overlapping arbitration with packet flow, according to one embodiment.

Simultaneously, in block S304B, a control value is written to a register, for example Weight_Restore FIFO 502 shown in FIG. 5, for the selected output VL whose "current-weight" is adjusted before the entire packet 200 has been received. The control value is used as a reminder to adjust the "current-weight" when the actual packet 200 is received.

At this stage, in block S306, the arbitration process and packet the flow overlap. Because of the adjustment to the "current-weight" based on an estimated packet size, a next arbitration cycle can begin while the packet is still in the process of being received.

Thereafter, in block S308, a request for a next packet is sent. Again, an approximate correction to a "current weight" is made, or if a packet has been completely received, then Weight_Restore FIFO 502 is read to make the actual adjustment based on the actual packet size.

Figure 4:
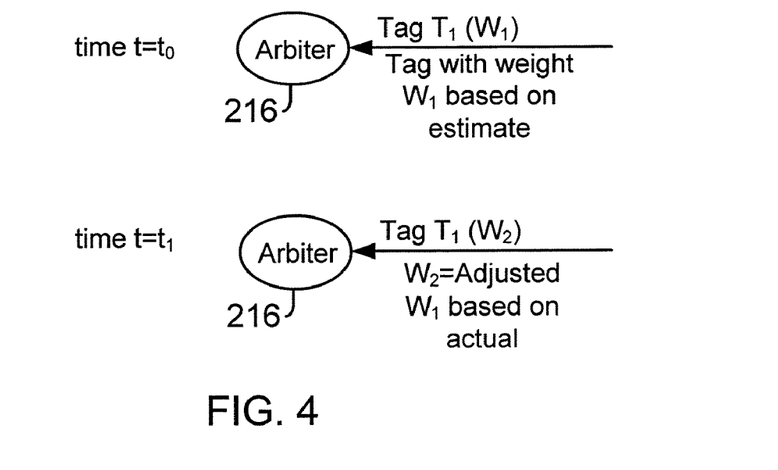
FIG. 4 shows an example of tag arbitration, according to one embodiment.

FIG. 4 shows an example of adjusting the "current-weight" for a virtual lane. At time, t=to, a tag T1 is received with weight W1. At time t=t1, the actual packet is received and the current weight W2 is adjusted based on the received packet size.

FIG. 5 shows an example of a schematic 500 for adjusting a "current-weight" and overlapping arbitration with packet flow, according to one embodiment. Schematic 500 may be used to implement the process steps of FIG. 3.

As shown in FIG. 5, a portion of a packet 200 is received in receive buffer 202. A tag 206 is generated that includes an estimated packet 200 count (234, FIG. 2C). Using the estimated packet size, a request for processing tag 206 is arbitrated by arbiter 216 without the packet being completely received at receive buffer 202.

When tag 206 is selected, arbiter 216 provides a packet identifier value 518 to logic 502, referred to as Weight Restore FIFO. Logic 502 stores the identifier information so that once the actual packet size is received and if the estimated size and the actual packet size are different, appropriate corrections can be made.

After tag 206 is selected for processing a request 514 is sent to receive buffer 202. Based on the request, packet data 512 for packet 200 is sent to logic 510 (shown as TMUX (transmit multiplexor)). Logic 510 provides the packet identifier and an actual packet size 520 to logic 502. Based on packet size 520 an indicator 530 is sent to Weight Restore Control module 504 (may also be referred to as module 504) to generate a control signal 524. The control signal 524 indicates to logic 508 to either subtract or add to an estimated arbitration weight that was used for selecting tag 206.

Besides control signal 524, logic 508 also receives the following information: (a) the estimated packet size 516 from arbiter 216; (b) a difference between the estimated packet size and actual packet size via signal 528 (shown as Credit Delta); and (c) an arbitration weight 532 from accumulator 506.

Based on this information, i.e., control signal 524, estimated packet size 516, credit delta 528, arbitration weight signal 532, logic 508 adjusts the arbitration weight for a packet. The adjusted arbitration weight 526 is then sent to arbiter 216 and to accumulator 506.

Arbiter 216 may use the adjusted arbitration weight 526 to arbitrate between other requests. Accumulator 506 uses the adjusted arbitration weight for the next cycle when another tag is selected for processing.

The system and processes disclosed herein have various advantages. For example, one does not have to wait for an entire packet, before one can arbitrate and select a packet for processing. The system disclosed herein performs arbitration based on an estimated size and then adjusts the estimate based on an actual packet size. This saves time and is more efficient than waiting to receive an entire packet, generating a tag and then arbitrating for selecting the tag.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A method for a switch element, comprising:
   (a) receiving a portion of a packet at a port of the switch element;
   (b) generating a tag based on an estimated packet size obtained from the portion of the packet;
   (c) sending the tag with the estimated packet size to a transmit segment of the port;
   (d) selecting a request from among a plurality of pending requests for processing the packet associated with the tag;
   (e) receiving an actual packet size for the packet in step (a);
   (f) determining if the actual packet size is different from the estimated packet size; and
   (g) adjusting an arbitration weight used for selecting the request in step (d), if the actual packet size is different from the estimated packet size.

2. The method of claim 1, wherein the estimated packet size is obtained from a field of a packet header for the received packet.

3. The method of claim 1, wherein an arbitration module arbitrates between the plurality of requests and selects the tag based on the estimated packet size.

4. The method of claim 3, wherein a control signal is generated to either add or subtract a value from the arbitration weight, based on a difference between the estimated packet size and the actual packet size.

5. The method of claim 3, wherein the arbitration module uses the adjusted arbitration weight for arbitrating between requests that are pending after the arbitration weight is adjusted.

6. The method of claim 1, wherein the packet is an InfiniBand packet.

7. The method of claim 1, wherein the packet is a non-InfiniBand packet.

8. The method of claim 1, wherein the tag is selected if credit is available at a destination for the received packet.

9. A switch element, comprising:
   (a) a receive segment at a port for receiving a portion of a packet, generating a tag based on an estimated packet size obtained from the portion of the packet; and sending the tag with the estimated packet size to a transmit segment of the port;
   (b) an arbitration module for selecting a request from among a plurality of pending requests for processing the packet associated with the tag; and
   (c) logic for determining if an actual packet size is different from the estimated packet size; and generating a control signal for adjusting an arbitration weight used for selecting the request, if the actual packet size is different from the estimated packet size.

10. The switch element of claim 9, wherein the estimated packet size is obtained from a field of a packet header for the received packet.

11. The switch element of claim 9, wherein based on a difference between the estimated packet size and the actual packet size, a value is added or subtracted from the arbitration weight.

12. The switch element of claim 9, wherein the arbitration module uses the adjusted arbitration weight for arbitrating between requests that are pending after the arbitration weight is adjusted.

13. The switch element of claim 9, wherein the packet is an InfiniBand packet.

14. The switch element of claim 9, wherein the packet is a non-InfiniBand packet.

15. The switch element of claim 9, wherein the tag is selected if credit is available at a destination for the received packet.

16. A method for a switch element, comprising:
   (a) receiving a portion of a packet at a receive segment of a port of the switch element;
   (b) generating a tag based on an estimated packet size obtained from the portion of the packet; wherein the receive segment generates the tag;
   (c) sending the tag with the estimated packet size to a transmit segment of the port; wherein the receive segment sends the tag to the transmit segment;
   (d) selecting a request from among a plurality of pending requests for processing the packet associated with the tag; wherein an arbitration module selects the tag from among the plurality of pending requests;
   (e) receiving an actual packet size for the packet in step (a);
   (f) determining if the actual packet size is different from the estimated packet size; and
   (g) adjusting an arbitration weight used for selecting the request in step (d), if the actual packet size is different from the estimated packet size.

17. The method of claim 16, wherein the estimated packet size is obtained from a field of a packet header for the received packet.

18. The method of claim 16, wherein a control signal is generated to either add or subtract a value from the arbitration weight, based on a difference between the estimated packet size and the actual packet size.

19. The method of claim 1, wherein the packet is an InfiniBand packet.

20. The method of claim 1, wherein the packet is a non-InfiniBand packet.

* * * * *